United States Patent
Zuccarello et al.

(12)

(10) Patent No.: US 6,409,982 B1
(45) Date of Patent: Jun. 25, 2002

(54) PROCESS FOR PRODUCTION OF POTASSIUM CARBONATE SESQUIHYDRATE

(75) Inventors: William J. Zuccarello, Cream Ridge, NJ (US); Elliot Block, Yardley, PA (US); Joseph A. Paluzzi, Hightstown; Kenneth R. Cummings, Skillman, both of NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

(21) Appl. No.: 09/764,920

(22) Filed: Jan. 18, 2001

(51) Int. Cl.⁷ ................................................. C01D 7/00
(52) U.S. Cl. ........................................................ 423/421
(58) Field of Search ................................ 423/192, 198, 423/209, 421, 641

(56) References Cited

U.S. PATENT DOCUMENTS 5,449,506 A * 9/1995 Berry et al. ................. 423/421

FOREIGN PATENT DOCUMENTS

DE          3816061 C1 * 8/1989  .............. 423/206.2

* cited by examiner

Primary Examiner—Steven P. Griffin
Assistant Examiner—Edward M. Johnson
(74) Attorney, Agent, or Firm—Irving M. Fishman

(57) ABSTRACT

This invention provides a process for the production of dry free-flowing potassium carbonate sesquihydrate. The process involves the controlled hydration of high purity anhydrous potassium carbonate. The product of the process has at least about 90 percent particle size distribution in the range between about 200–1500 microns. The invention potassium carbonate sesquihydrate has properties which adapt the product for utility as a macromineral nutrient in animal feedstocks.

7 Claims, No Drawings

PROCESS FOR PRODUCTION OF POTASSIUM CARBONATE SESQUIHYDRATE

BACKGROUND OF THE INVENTION

This invention relates to a method of preparing a free-flowing inorganic salt product. More specifically this invention relates to the production of free-flowing potassium carbonate sesquihydrate which has properties that adapt the product for utility as a macromineral nutrient in animal feedstocks.

Dietary macromineral elements are necessary for proper health and productive performance of lactating dairy cows. As a class of nutrients, these elements have been the subject of extensive research, and considerable information exists about individual effects of each micromineral element. Information on is interrelationships of macromineral elements in diets for lactating dairy cows is relatively limited.

An early publication was the first to propose that mineral interrelations were related to acid-base status [J. Biol. Chem., 58, 235 (1922)]. It was proposed further that maintenance of normal acid-base equilibrium required excretion of excess dietary cations and anions. It was hypothesized that consumption of either excess mineral cations relative to anions or excess anions relative to cations resulted in acid-base disturbances in animals (A. T. Shohl. Mineral Metabolism. Reinhold Publishing Corp., New York. 1939).

Once animal nutritionists began to test this hypothesis, mineral interrelationships were found to affect numerous metabolic processes, and there was evidence that mineral interrelationships had profound influences. It was theorized that for an animal to maintain its acid-base homeostasis, input and output of acidity had to be maintained. It was shown that net acid intake was related to the difference between dietary cations and anions. The monovalent macromineral ions Na, K and Cl were found to be the most influential elements in the interrelationship (P. Mongin. Page 1, Third Ann. Int. Mineral Conf. Orlando, Fla. 1980).

Nutrient metabolism in animals results in the degradation of nutrient precursors into strong acids and bases. In typical rations fed to dairy cattle, inorganic cations exceed dietary inorganic anions by several milliequivalents (meq) per day. Carried with excess dietary inorganic cations are organic anions which can be combusted to $HCO_3^-$. Consequently, a diet with excess inorganic cations relative to inorganic anions is alkaline, and a diet with excess inorganic anions relative to cations is acidogenic.

Chloride is the most acidogenic element to be considered. An excess of dietary chloride can lead to a respiratory and/or metabolic acidosis. This is critical in ruminant nutrition because of salt (NaCl) feeding both in the diet and on an ad libitum basis. The acidogenic influence of chloride can be negated by sodium and potassium which are alkalogenic elements. Conversely, excess intake of sodium or potassium can induce metabolic alkalosis.

Blood Ph ultimately is determined by the number of cation and anion charges absorbed in the blood. If more anions than cations enter the blood from the digestive tract, blood Ph will decrease. It was proposed that a three-way interrelationship among dietary Na, K and Cl, i.e., the sum of Na plus K minus Cl [in meq per 100 g diet of dry matter (DM)], could be used to predict net acid intake. The term "dietary cation-anion difference (DCAD)" was coined to represent the mathematical calculation (W. K. Sanchez and D. K. Beede. Page 31, Proc. Florida Rum. Nutr. Conf. Univ. of Florida. 1991). Expressed in its fullest form, DCAD is written as follows:

meq $[(Na^+ + K^+ + Ca^{+2} + Mg^{+2}) - (Cl^- + SO_4^{-2} + PO_4^{-3})]/100$ g of dietary dry matter (DM).

A problem with including the multivalent macrominerals (Ca, Mg, P and S) in the DCAD expression for ruminants relates to the variable and incomplete bioavailability of these ions compared to Na, K and Cl. The expression employed most often in ruminant nutrition is the monovalent cation-anion difference:

meq $(Na^+ + K^+ - Cl^-)/100$ g dietary DM

Because of the additional use of sulfate salts in prepartum rations, the expression that has gained most acceptance in ruminant nutrition is as follows:

meq $(Na^+ + K^+) - (Cl^- + SO_4^{-2})/100$ g dietary DM

For a calculation, mineral concentration are first converted to milliequivalents:

$$\text{meq}/100\ g = \frac{(\text{milligrams})(\text{valence})}{(\text{g atomic weight})}$$

The following illustrates a calculation of the meq Na+K−Cl−S value of a diet with 0.18% Na, 1.0% K, 0.25% Cl and 0.2% S. There are 180 mg Na (0.18%=0.18 g/100 g or 180 mg/100 g), 1000 mg K (1.0% K), 250 mg Cl (0.25% Cl) and 200 mg S (0.2% S) per 100 g dietary DM. The $S_4^-$ entity is calculated as atomic sulfur.

$$\text{meq Na} = \frac{(180\ mg)(1\ \text{valence})}{(23\ g\ \text{atomic weight})} = 7.8\ \text{meq Na}$$

$$\text{meq K} = \frac{(1000\ mg)(1\ \text{valence})}{(39\ g\ \text{atomic weight})} = 25.6\ \text{meq K}$$

$$\text{meq Cl} = \frac{(250\ mg)(1\ \text{valence})}{(35.5\ g\ \text{atomic weight})} = 7.0\ \text{meq Cl}$$

$$\text{meq S} = \frac{(200\ mg)(2\ \text{valence})}{(32\ g\ \text{atomic weight})} = 12.5\ \text{meq S}$$

The calculated DCAD value is as follows:

meq (Na+K−Cl−S)=7.8+25.6−7.0−12.5=13.9 meq/100 g dietary DM

A simpler expression is as follows:

DCAD=(0.18% Na/0.023)+(1.0% K/0.039)−(0.25% Cl/0.0355)−(0.2%/0.016)=+13.9 meq/100 g dietary DM As indicated above, the macrominerals in a ruminant feedstock have significant metabolic interrelationships relative to the health and lactational performance of dairy cattle. Animal trials have indicated that a magnesium deficiency results in failure to retain potassium, which can lead to a potassium deficiency. Also, excessive levels of potassium interfere with magnesium absorption. Because sodium and potassium must be in balance, excessive use of salt depletes an animal's potassium supply (pages 99–104. Feeds & Nutrition. Second edition, Ensminger Publishing Co., 1990).

Clinical studies have provided evidence that magnesium is essential for keeping the intracellular potassium constant. Dietary deprivation of magnesium is accompanied by muscle potassium deficit despite an abundant supply of potassium. In animal studies, a diet depleted of potassium caused a significant hypokalemia and hypermagnesemia, a diuresis and natriuresis, a magnesiuria, and a decrease in the fecal excretion of magnesium (Chapter 12. Magnesium:Its Biological Significance. CRC Press, Inc., Boca Raton, Fla.).

"Nutrient Requirements of Dairy Cattle" (1989) by the National Research Council lists recommended nutrient content of diets for dairy cattle (Table 6-5, page 87). For early lactation, the recommended diet contents are 0.18% sodium, 1% potassium, and 0.25% magnesium (DM basis). Under conditions of heat stress, potassium can be increased to 1.2%; and under conditions conducive to grass tetany, magnesium can be increased to 0.3% to satisfy distress macromineral requirements.

An important aspect of formulating ruminant feedstocks is the quality and adaptability of macromineral nutrient sources. With respect to potassium-containing macrominerals, the preferred sources are potassium bicarbonate and potassium carbonate sesquihydrate. Anhydrous potassium carbonate is not a desirable macromineral nutrient since it tends to generate heat when formulated in a ruminant feedstock, and the consequence is a less palatable feedstock. Potassium bicarbonate has a low content of potassium cations, which is a practical disadvantage.

Potassium carbonate sesquihydrate is a preferred form of macromineral nutrient for ruminant feedstock, but it is not available as a high purity product which is qualified for beneficial formulation of ruminant feedstocks.

Accordingly, it is an object of this invention to provide a potassium carbonate sesquicarbonate composition which has advantageous properties for blending into a ruminant feedstock as a calculated quantity of potassium-containing micromineral nutrient.

It is another object of this invention to provide a high purity crystalline potassium carbonate sesquihydrate composition which is free-flowing and has a narrow range of particle size distribution.

It is a further object of this invention to provide a process for producing free-flowing crystalline potassium carbonate sesquihydrate which has at least about 90 percent particle size distribution in the range between about 200–1500 microns.

Other objects and advantages of the present invention shall become apparent from the accompanying description and example.

DESCRIPTION OF THE INVENTION

One or more objects of the present invention are accomplished by the provision of a process for producing crystalline potassium carbonate sesquihydrate ($K_2CO_3 \cdot 1.5\ H_2O$) which comprises admixing particulate anhydrous potassium carbonate with a 20–60 weight percent aqueous solution of potassium carbonate at a temperature between about 50°–210° F. at a rate between about 3–8 pounds of solution per pound of acilitat potassium carbonate per minute of addition, until stoichiometric hydration of the anhydrous potassium carbonate is achieved; wherein the resultant potassium carbonate sesquihydrate has at least about 90 percent particle size distribution in the range between about 200–1500 microns.

The anhydrous potassium carbonate starting material is a commercially available high purity product (Church & Dwight Co., Princeton, N.J.). The starting anhydrous material has a content of less than about 2 percent of potassium hydroxide, which is a residual byproduct of the manufacturing process that involves carbonation of potassium hydroxide.

The particle size distribution of the anhydrous potassium carbonate starting material is not critical for purposes of the invention process. A fine particle size is desirable, since it facilitates efficient performance of the invention process for production of potassium carbonate sesquihydrate.

The commercially available anhydrous potassium carbonate has at least about 90 percent particle size distribution in the range between about 75–1200 microns. This fine particle size distribution is advantageous for optimally effective operation of the invention process.

An essential feature of the invention process for production of potassium carbonate sesquihydrate is utility of an aqueous solution of potassium carbonate as a reaction medium, rather than a straight aqueous medium.

When neat aqueous medium is employed in the process, it is difficult to conduct the hydration of anhydrous potassium carbonate reaction to completion. During the hydration reaction, there is an agglomeration and formation of large masses of partially hydrated starting material.

An investigation of the early processing difficulties lead to the development of the present invention process. It is believed that the excellent results of the present invention process are due to the effect of the potassium carbonate medium on the hydration phase transition. At the molecular level, the anhydrous potassium carbonate dissolves in the aqueous reaction medium, and the hydration reaction is moderated by the presence of the potassium carbonate solute in the aqueous reaction medium. The overall effect is the production of free-flowing particles of potassium carbonate sesquihydrate, at least 90 percent of which are in the range between about 200–1500 microns. Typically, the product of the process has at least about 90 percent of the free-flowing annular particle distribution in the range between about 300–1000 microns, and at least about 50 percent of particle distribution in the range between about 400–800 microns.

The invention process can be conducted conveniently at ambient temperatures, with the aqueous potassium carbonate reaction medium being sprayed on a stirred bulk of anhydrous potassium carbonate powder. In a typical operation, a 50 weight percent aqueous potassium carbonate solution is admixed with anhydrous potassium at an ambient temperature of about 70° F., and at a rate of about five pounds of solution per pound of anhydrous potassium carbonate per minute of addition. As illustrated in the Example, the heat of hydration increases the is reacting admixture to a temperature of about 130° F. or higher. The product is recovered directly in a dry free-flowing state, without the need for a drying cycle.

Although the invention process is sufficiently versatile to provide a dry free-flowing potassium carbonate sesquihydrate product directly, it is advantageous to include a flow-aid additive to insure long term free-flow properties. The flow-aid can be magnesium oxide or other suitable commercially available composition. It is preferred to add the flow-aid to the final product of the invention process, although addition before or during the processing cycle also is effective in terms of subsequent product flow properties.

There is a secondary advantage to inclusion of a flow-aid additive such as magnesium oxide to the potassium carbonate sesquihydrate product of the invention process. The blending of a flow-aid into the product causes a reduction in bulk volume. The degree of bulk volume reduction can be up to about 20 percent. The bulk volume reduction facilitates packaging and transporting, and the product is in a convenient form for end-use formulations.

In a further embodiment this invention provides a free-flowing crystalline potassium carbonate sesquihydrate product having a content between about 0.2–15 weight percent of anhydrous potassium carbonate; wherein the product has at least about 90 percent particle size distribution in the range between about 200–1500 microns. The product is further characterized as having at least about 50 percent annular particle size distribution in the range between about 400–800 microns.

The presence of anhydrous potassium carbonate in the potassium carbonate sesquihydrate product maintains long-term free-flow properties in the product without the use of a flow-aid additive. The anhydrous potassium carbonate content can be added to the final product, or it can be residual in situ starting material which intentionally results from less than a stoichiometric hydration of the original anhydrous potassium carbonate reactant.

The free-flow properties of present invention potassium carbonate sesquihydrate facilitate uniform blending of the product into animal feedstocks. The high purity of the product allows for accurate and reliable addition of a calculated quantity. Also, if an aqueous solution is desired, the particle size distribution in the invention potassium carbonate sesquihydrate acilitates rapid dissolution of the product in an aqueous medium. Because of the hydrated state of the potassium carbonate, the particles disperse in the aqueous medium without agglomeration, and the aqueous salt solution forms without generation of heat of hydration.

The following Example is further illustrative of the present invention. The components and specific ingredients are presented as being typical, and various modifications can be derived in view of the foregoing disclosure within the scope of the invention.

EXAMPLE

This Example illustrates the manufacture of potassium carbonate sesquihydrate ($K_2CO_3.1.5\ H_2O$) in accordance with the present invention.

A

A feed solution is prepared by charging 3000 pounds of commercially available potassium carbonate to 405 gallons of water within a dissolver until fully dissolved. The formed 47% w/w solution is transferred through an inline filter to a rotary drum reactor. Alternately, a commercially available 47% potassium carbonate solution is used as the feed solution.

The feed solution is then passed through an inline filter (with a 1-micron filter cartridge) to a spray nozzle header positioned longitudinally above the bed inside the rotary drum reactor, at a rate of about 0.2 gallons per minute (GPM). This feed rate is controlled by regulating the feed solution through a rotameter and pump recycle line.

The rotary drum, 36-inches in diameter by 60-inches long and having backward-inclined flights and a variable frequency AC drive, is used as the reactor. The drum is rotated at a speed of 16 revolutions per minute (RPM). A 1.5-inch diameter volumetric screw feeder is used to deliver anhydrous potassium carbonate to the reactor at a rate of about 400 pounds per hour. The average working volume of the reactor is about 5 cubic feet, with a retention time of about 1 hour.

The reacting mass is maintained at temperature between 120°–150° F. The potassium carbonate sesquihydrate product is discharged from the rotary drum reactor through an 18-inch vibratory screener fitted with a #10 U.S. Mesh screen. Oversized material is crushed and combined with the product, or recycled to the dissolver. The product is cooled to less than 100° F. before storage or bagging to prevent caking and/or moisture migration. The water of hydration in the product is about 14.5 weight percent, and the product has an anhydrous potassium carbonate content of about 11.3 weight percent.

The product of the process has about 92 percent particle size distribution in the range of 300–1000 microns, and about 55 percent particle size distribution in the range of 400–800 microns.

The free-flowing product of the process has annular smooth-surfaced crystals with low specific B.E.T. surface areas, and is essentially free of particle agglomerates. It has excellent properties for application as a maromineral in animal feed stocks.

B

When the manufacturing procedure is operated with plain water instead of an aqueous potassium carbonate solution as illustrated above, the operation is discontinued because of a massive agglomeration of the water and anhydrous potassium carbonate admixture into large blocks.

What is claimed is:

1. A process for producing crystalline potassium carbonate sesquihydrate ($K_2CO_3.1.5\ H_2O$) which comprises admixing particulate anhydrous potassium carbonate with a 20–60 weight percent aqueous solution of potassium carbonate at a temperature between about 50°–210° F. at a rate between about 3–8 pounds of solution per pound of anhydrous potassium carbonate per minute of addition, until stoichiometric hydration of the anhydrous potassium is achieved; wherein the resultant potassium carbonate sesquihydrate product has at least about 90 percent particle size distribution in the range between about 200–1500 microns.

2. A process in accordance with claim 1 wherein the anhydrous potassium carbonate reactant has at least about 90 percent particle size distribution in the range between about 300–1000 microns.

3. A process in accordance with claim 1 wherein the potassium carbonate sesquihydrate product has at least about 50 percent annular particle size distribution in the range between about 400–800 microns.

4. A process in accordance with claim 1 wherein the potassium carbonate sesquihydrate product has a content between about 0.5–5 weight percent of flow aid agent, and the product is free-flowing and has reduced bulk volume.

5. A process in accordance with claim 1 wherein the potassium carbonate sesquihydrate product has a content between about 0.2–15 weight percent of anhydrous potassium carbonate as determined by the addition of less than a stoichiometric quantity of aqueous solution during the hydration reaction, and wherein the potassium carbonate sesquihydrate product is dry and free-flowing.

6. A free-flowing crystalline potassium carbonate sesquihydrate product having a content between about 0.2–15 weight percent of anhydrous potassium carbonate; wherein the product has at least about 90 percent particle size distribution in the range between about 200–1500 microns.

7. A free-flowing product in accordance with claim 6 wherein the product has at least about 50 percent annular particle size distribution in the range between about 400–800 microns.

* * * * *